July 9, 1940.    P. A. FRIEDELL    2,207,375
PHOTOGRAPHIC MEASURING AND CALCULATING SCALE
Filed Aug. 19, 1939
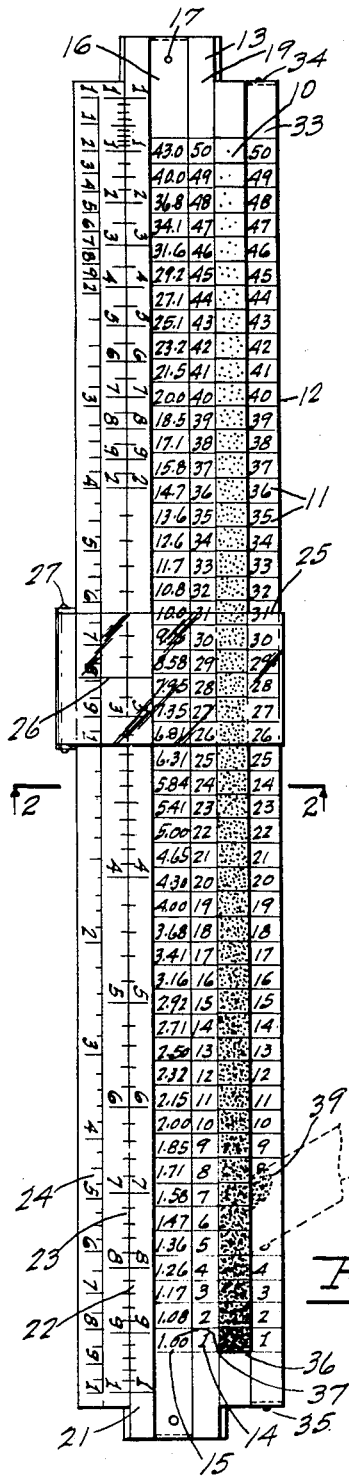
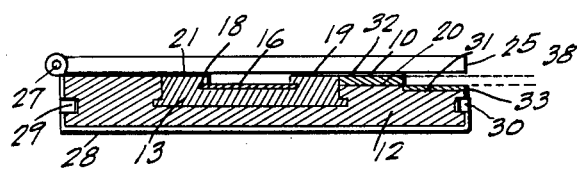
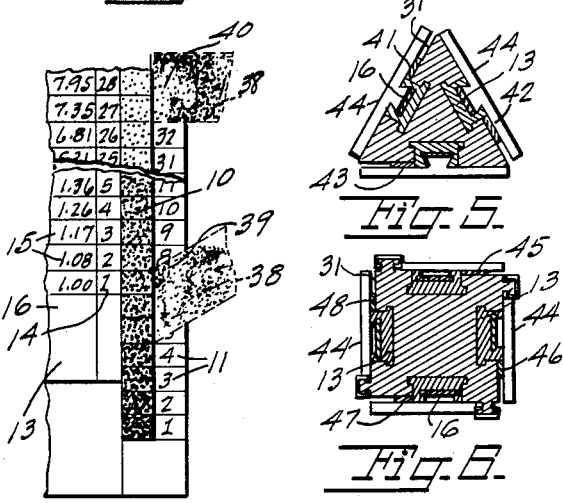
Inventor
Philip A. Friedell Patented July 9, 1940

2,207,375

UNITED STATES PATENT OFFICE 2,207,375

PHOTOGRAPHIC MEASURING AND CALCULATING SCALE

Philip A. Friedell, Oakland, Calif.

Application August 19, 1939, Serial No. 291,036

17 Claims. (Cl. 235—70)

This invention, a photographic measuring and calculating scale and method of measuring is a modification of my copending application, Serial Number 227,365, filed August 29, 1938, for Photographic scale and system of determination and measurement of photographic characteristics, and includes some new and advantageous features, particularly as to extreme precision, facility and speed of measurements and calculations.

In the copending application the measuring scale is printed from a negative, and the serial numbers and exposure factors are fixed relative to predetermined tones. That system has particular advantages with reference to speed or sensitivity determinations and with certain other measurements and determinations, since certain determinations are established by and directly readable on the print.

This new scale may be printed in the same manner as that in the copending application, but is preferably made by direct exposure without intervening light-blocking means, whereby extreme precision of relative tones is secured and exact values are established by the exact amount of photoactinic light producing each tone.

In addition, this new scale has tonal range values and its exposure factors adjustable relative to the tone scale so that direct measurements may be made from any tone, and these values are reversible on the scale so that readings may be taken from either the high or the low end of the tone scale, and in addition the element carrying the exposure factors is interchangeable with others carrying different series of factors for correct evaluations of different types of materials. The scale also includes a presser plate for precision tone matching and measurements, and scales for calculating required values from the values and measurements obtained through the tone scale.

Although this scale could be made on the disc principle, for various reasons it would not prove as satisfactory as the slide-rule type illustrated, therefore this slide-rule type is the preferred form of the invention.

The objects and advantages of this invention are as follows:

First; to provide a photographic scale with a scale of tones ranging from one extreme to the other, and to evaluate the respective tones in conformity with the relative exposures producing the tones, so that the exact density in terms of photo-actinic light-blocking characteristics may be measured by forming a print therefrom and measuring the tone or tones produced.

Second; to provide a scale as outlined with the tones serially numbered so that the range of any negative may be determined by printing, and measuring the deepest and lightest portions of the print and determining the range by the difference between the serial numbers of the tones matched on the scale by said portions.

Third; to provide a scale as outlined in which the range values and exposure factors are adjustable relative to the scale of tones so that direct values may be obtained by adjusting the unit values to coordinate with one of the tones matched.

Fourth; to provide a scale as outlined with calculating means so that exposures for selected papers and other values involved in processing may be directly calculated by the same means used in measuring a print and involving the values and measurements obtained through the tone scale.

Fifth; to provide a scale as outlined in which suitable support means is provided to locate the surface of a print being measured and the surface of the tone scale in the same plane for precision matching.

Sixth; to provide a scale as outlined with a combined cursor and holddown for operation as a cursor with the slide-rule elements of the scale and to flatten and hold the surfaces of the print being measured and that of the tone scale in the same plane during the matching process.

Seventh; to provide a simplified method of measuring and determining the exposure factors of photo-sensitive materials, power of various sources of illumination in values of photo-actinic light, basic densities or exposure factors of film and plate bases and densities of other materials as compared to air or another density, densities and exposure factors of various details of negatives, relative potential of developers and constituent elements, effects of intensifiers and reducers, and of balancing separation negatives.

In describing the invention, reference will be made to the accompanying drawing, in which;

Fig. 1 is a plan view of the invention.

Fig. 2 is an enlarged section taken on line 2—2 of Fig. 1.

Fig. 3 is a fragmentary view illustrating the method of operating the scale.

Fig. 4 is a fragmentary view of a chart which is preferably applied to the back of the scale for instant reference.

Fig. 5 is a transverse section through a three-color or triple-value scale.

Fig. 6 is a transverse section through a four-color or four-value scale.

The invention consists primarily of a tone scale made either according to the method disclosed in the previously-mentioned copending application, or by direct step-exposure of the material forming the scale.

This tone scale 10 is provided with a first series of tonal range numbers 11 coordinated with the respective steps of the scale and starting at one extreme tone of the scale and continuing through to the other extreme, and may be formed either directly on the various steps, or subsequently applied to the support as indicated.

The scale 10 is mounted on the body 12 of a slide rule Fig. 1 and the slide 13 has a second series 14 of tonal range numbers corresponding to the first or fixed series 11, and is also provided with a series of exposure factors 15 starting with a value of one (1.00) for duplicate serial number 1 or the slide index and continuing throughout the series in geometrically-progressively increasing values based on the exposure-factor range of the material forming the measuring prints, or on the relative exposures given the various steps as related to a unit value where the same material is to be used for making the measuring prints, and when made from the negative of the copending application, to be based on the actual photo-actinic transmission factors of the densities in the negative from which it is produced. The series of exposure factors is preferably made removable for substitution of different series for different materials.

The second or duplicate series of tonal range numbers and the series of exposure factors are adjustable relative to the first series and to the tone scale, and are indicated as being mounted on the slide 13 with the exposure factors formed on a separate strip 16 which is maintained in relative position by a pin 17 and is retained in the slide within the groove 18, so that the exposure factor scale may be removed and replaced by one having a different series of values for correct evaluation of a different photographic medium, and also provided for reversal of the series for different types of measurements.

The second series of tonal range numbers is illustrated as formed on the face 19 of the slide, but may be formed on the strip 16, the strip then being made correspondingly wider. The tone scale 10 is mounted on the depressed face 20 of the body.

Formed on the face 21 of the slide is a log scale 22, equivalent of scale "C" on the usual slide rule, and a coordinating scale 23, the equivalent of scale "D" is formed on the surface 24 of the body, are formed at the very edges of the respective slide and body and are used for multiplication and division for establishing final values from the measurements and values obtained from the tone scale and related tonal range and exposure factor values.

A third scale 24, equivalent to the "A" scale on a slide rule is formed in registrable relation to the scale 23 and has twice the number of cycles as the scale 23 and is used for calculating light distances and diaphragm openings for required light values and for calculating exposures in connection with enlarging processes, all of which values are dependent upon measurements and values obtained through the tone scale.

A cursor 25 has a hair line 26 for coordination of the slide rule values and graduations and also functions as a holddown or presser plate for holding the surfaces of scale 10 and the print being measured in the same plane.

This cursor is preferably hinged as indicated at 27 and mounted on a sliding shoe 28 which has spring fingers 29 and 30 operating in grooves as indicated and which grooves are formed throughout the length of the sides of the body 12. This cursor is preferably formed of a tinted glass or other transparent material, for neutral matching, so as to neutralize variations of tones between the scale and the print being measured, and which prints usually vary from a true neutral through bluish to greenish-black, and the most suitable tint is one included in the range yellow, orange, amber, amber being the most efficient. Hinging of the cursor permits convenient cleaning of the underside, since it is absolutely essential that the cursor be kept scrupulously clean to avoid misreadings and miscalculations of the matched tones.

The print support or shelf 31 is formed on a plane below the plane of the surface 32 of the tone scale and at a distance below equal to the thickness of the materials to be measured, since for precision measurements or matching the surfaces matched must be in exactly the same plane. Any variation in the planes of the two elements either as to elevation or angularity will affect the accuracy of the determinations. If only one weight of papers is to be measured this distance will be equal to the thickness of the paper, but if both, single- and double-weight papers are to be measured, the distance is made equal to the thickness of the double-weight paper, and a removable filler strip 33 is provided, which may be formed of celluloid or other suitable material, clipped over the ends of the body as indicated at 34; suitable pins 35 keeping the filler in place.

In making the tone scale by direct exposure, a master developer, master light and master paper are used, and for all ordinary measurements the master paper should be the softest grade of a high quality paper so that it will be able to cover the range of comparatively strong or contrasty negatives, and the cumulative exposures for the tone scale should be such as to produce critical black in the first step, and the initial exposure to produce substantially white in the last step. This print is then evaluated in opposition, that is, the initial black or critical black end is given the serial number 1 and the unit exposure factor, for all measurements except threshold speeds of positive materials, under which conditions the exposure factor scale is turned end for end, the index being indicated at 14 and the initial or critical black step being indicated at 36. The final tint or substantially white step is numbered "50" indicating a tonal range of fifty for the master paper from which the tone scale is printed.

Although step "1" indicated at 36 received the longest exposure, it is given the value of 1.00 indicated at 37, and the shortest exposed end will have the relative value of the longest exposure or that actually given to step 1, in this case having a value of forty-three (43.0). The values for the respective steps are established by dividing the exposure given each step by the exposure given the threshold step, as "50" and then applying the values to the steps in reverse.

Initial black is the first totally black step from which no further increase in depth is secured through additional exposure, and critical black occurs several steps above initial black and has an exposure factor equal to about 77% of the initial black step. Between initial black and critical black similar increases in exposures produce similar increases in depth of tone with different makes and grades of papers, while above critical black, the decreases in tone depth vary directly with the tonal range of the paper. A paper having a tonal range of twenty-five will have a decrease in tone equal to twice that of a paper having a tonal range of fifty for the same decrease in exposure.

Use of the scale is carried out as follows:

For determining the exposure factor of different batches of master paper, a strip of the paper is exposed directly to the master light to produce some neutral tone, timed and developed in the master developer, and dried. The print is then matched for tone by the scale and the exposure factor of the matching tone noted. Suppose the tone matches step 19, exposure factor 4.00, and that the light produced five foot candles on the paper and that the exposure was five seconds. The index of scale 22 is set at 4.00 on scale 23, and the cursor hair line 26 is set at 5.00 on the scale 22, the slide is again moved to bring the index of scale 22 under the hair line, the cursor is then moved to bring the hair line over 5.00 on the slide, and the value of one hundred foot candle seconds is read on scale 23 under the hair line. Thus, to produce critical black on this paper, the exposure must be increased from the five seconds or the twenty-five foot-candle-seconds given, to twenty seconds or one hundred fcs., and 100.00 is the exposure factor of the master paper tested.

For determining the tonal range of papers, the paper is exposed in a series of steps and developed. The exposure given the first step above black, say 20 seconds, is divided by the exposure given the first step below white, say 4 seconds. Ratio=20/4=5.00. The first tone above black is next matched with the corresponding tone on scale 10 and the index at 36 is moved to that tone by adjustment of the slide. The first tone below white is now matched with the corresponding tone on scale 10 and the corresponding adjusted serial number of the tone noted, say "40."

The serial number corresponding to a ratio of 5.00 according to the graduations illustrated, is "22". The range of the master paper is "50," therefore the tonal range of the paper under test is 22/40×50=27.5, readily calculated by the slide rule portion.

For determining the photo-actinic value of any source of illumination, a strip of master paper is exposed to the light under test to produce a tone falling between the extremes and the exposure in seconds noted. Following master development and drying, the print is measured by means of the tone scale and the exposure factor of the tone noted, say 2.00. The exposure factor of the master paper is 100.00 fcs. and the exposure of the test say 40 seconds. The corrected exposure will be 40×2.00=80 seconds, and the light thus has a value of 100/80=1.25 foot candles, equal to the master paper exposure factor divided by the corrected exposure.

For determining the speed of papers other than the master paper, an exposure factor strip having evaluations based on the tonal range of the paper to be tested is substituted for the strip or scale 16. The process is then identical to that used for the master paper. This substitute scale is calculated as follows: Range of paper as previously determined=27.5. Corresponding exposure factor=7.65. Ratio of steps, $$R = \sqrt[50-1]{\frac{7.65}{1.00}} = 1.043$$

instead of the ratio of 1.08 for the master paper. If the deepest tone of the paper under test matches say step "6," the exposure factor of the paper will be $100 \times 1.043^5 = 123.00$ fcs.

Films and plates are tested in the same manner except that the master paper is exposed through the negative produced, using the basic exposure, and then measuring the print.

For determining the potential of a developer, two prints are made on master paper with identical exposures and one is developed in the master developer and the other in the developer under test. The prints, after drying, are measured by the tone scale and the index is moved to the deeper tone matched, the exposure factor of the other tone establishes the relative potential. If the master-developed print is lightest in tone, the slide can be removed and replaced end for end and the index matched with the master-print tone. The potential factor will then be directly readable for increasing potentials.

For determining the tonal range and exposure factor of a negative, the master paper is master printed through the negative and master developed. The deepest shadow on the dry print is measured with the slide adjusted in its normal position as illustrated in Fig. 1 and the exposure factor is read directly.

Referring to Fig. 1, the measuring print 38 has its deepest shadow 39 matching step 7, the co-ordinating exposure factor being 1.58, which is thus established as the exposure factor of the negative, and, the correct exposure for this negative will be, irrespective of the make or grade of paper, 1.58 times the exposure factor of the paper.

The slide is now adjusted to bring the index "1" of the tonal range numbers in registry with tone "7," see Fig. 3. Next, the highest light, say a white cloud 40 is matched and is indicated as matching between step numbers 27 and 28 or 27½, which is the approximate tonal range of the negative and close enough for all practical purposes.

Referring to the chart on the back of the scale, Fig. 4; Conta paper, grade 3, has a range of 27, therefore this is the correct grade of paper to use with this negative. The basic exposure factor of this paper is 130.00 fcs. A perfect print will result through master development.

For precision determination of tonal range, after the exposure factor of the negative is determined, a second print is made on the master paper through the negative, using the corrected exposure of $100 \times 1.58 = 158.00$ fcs., and this new print is then measured for the exact tonal range, and the deepest shadow will now match the deepest tone on the scale.

*Extreme precision scales*

The tonal range of the hardest paper available is about ⅕ that of the softest paper; thus with a tonal range of fifty for the softest paper, the hardest paper will have a tonal range of ten, and the relative exposure factors are respectively 43.0 and 2.00. If the exposure factor of 2.00 of the hardest paper is extended to embrace fifty tones, the ratio of progression will be 1.014 and the same visual difference in successive tones will result as results with the 1.08 ratio for the softest paper, and direct readings may be made to 1.4% instead of to the 8% with the softest paper.

However, a scale of fifty tones is easily readable to half tones, and scales up to 200 tones are matchable if the matching is very carefully carried out by absolutely abutting the clean-trimmed print with the edge of the tone scale and applying pressure through the presser plate to bring both tone surfaces in exactly the same plane, and using an amber or other suitably tinted cursor to neutralize the tones. A scale of 200 tones will have a ratio of progression of 1.0035, and therefore it will be possible to read tones and densities, particularly desirable for fog, to as fine a measurement as one-third of one percent or 0.35%.

For precision determinations with this scale, the same hardest grade of paper is used for making all measuring prints, and thereby visually imperceptible fog, detail and stain in a negative can be measured with absolute precision, precision characteristic curves can be plotted, and speeds and sensitivities of films and plates can be measured with the utmost accuracy.

With either type of scale, densities can be measured from zero to absolute opacity, unmeasurable by any other means. For opacities extending beyond the range of the paper it is merely necessary to make a second print with an exposure equal to a multiple of the exposure given the first print and then multiply all exposure factors by the multiple.

Other measurements and determinations can be made with this scale and the method involved, such as balancing separation negatives, characteristic curve development, matching or measuring color tones or hues, measuring characteristics and effects of different developers and their constituent chemicals, degree of dilution and of temperature; of intensifiers and reducers; balancing photographic wedges, and balancing reversals.

This scale can be made with a tone scale of any color, including such as sepia, green, blue and other colors which are produced directly or by toning, and can also be made in other colors produced indirectly, such as by the well-known three-color processes in which the original black-and-white tone scale is processed to form a matrix and using this matrix for transferring the dye to a suitable base material; the tones thus ranging from one extreme to the other and being evaluated in terms of the original black-and-white print.

For three-color work, instead of having but one face, the scale can readily be made triangular in cross-section as illustrated in Fig. 5, with the respective primary color scales 41, 42 and 43 mounted on the respective faces, and with a cursor or presser plate 44 for each face; or if a black-and-white scale is also desired, the scale can be made square in cross-section as indicated in Fig. 6, with the three primary-color scales and the black-and-white scale, respectively 45, 46, 47 and 48 mounted on the respective faces, and with a presser plate for each face.

With these types of scales, a plurality of black-and-white tone scales can be mounted on the same unit, such as for a plurality of different ranges or different degrees of precision.

With disc type scales, (not shown) a scale can readily be formed on each face.

It will be understood that variations in construction and arrangement of parts and in the methods of use, which variations are consistent with the appended claims, may be resorted to without detracting from the spirit or scope of the invention, or sacrificing any of the advantages thereof.

I claim:

1. A photographic scale comprising; a body material formed with a series of steps of gradually varying tone intensities and having an abuttable edge with the tones terminating at said edge for abutting comparison with a tone to be measured; exposure factors applied to the successive tones and based upon relative exposures required to produce like tones on a predetermined photosensitive material, whereby upon abutting a material having a tone or tones to be measured with said edge, each step is a measure of a characteristic and the value of the characteristic of the tone or tones to be measured is established by the exposure factor of the abutted step matched by the tone to be measured.

2. A measuring scale, in combination, two members comprising a body and a slide relatively adjustable; a tone scale comprising a series of tones and a first series of numbers fixedly associated therewith for tone identification and range measurements and mounted on one of said members; and a second series of numbers identical to said first series and registrable with said tones and with said first series and including an index and mounted on the other member for relative adjustment for tonal range measurements; a series of exposure factors of the tones mounted on said other member and fixedly associated and coordinated with the second series of numbers; said series of tones all terminating in an abuttable edge for abutting comparison with a print carrying tones to be measured for determination of characteristics of photographic materials, elements or processes of which the print is a result or product; coordination of the two series of numbers establishing directly by the exposure factor associated with a tone matched the characteristic value of the photographic material, element or process being measured and establishing the position thereof on the tone scale by the coordinating serial numbers; relative movement of said members to coordinate the index of the second series of numbers with the tone matched by the abutting print and matching of a second tone of the print establishing directly the values of variations in tone or the tonal range of the material, element or process being measured by the serial number of the second series coordinating with the second tone as matched by the abutting print and establishing the included characteristic value between the tones by the coordinating exposure factors and the ratio therebetween.

3. A structure as defined in claim 2 in which the surface of the tones are raised above the body to a height equal to the thickness of the print to be measured and with the body extending from the abuttable edge to form a support for the print for abutting and planar coordination between a tone of the scale and that of a print.

4. A structure as defined in claim 2 in which the series of tones is carried by the body and with the surface of the tones located in a plane above the body at a height equal to the thickness of prints to be measured and with the body extending from the abuttable edge of the series of tones to form a support for a print for abutting and planar coordination between a tone of the scale and that of the print, and in which the exposure factors are formed on an element removably retained by the slide for substitution of a different series of exposure factors at will for measuring a different photographic material by the same series of tones.

5. A structure as defined in claim 2, and a cursor movable relative to said members and associated therewith and forming a presser plate for manual application of pressure for precision coordination of the planes of the surface of a tone being matched and that of the print being measured.

6. A structure as defined in claim 2 in which the surface of the tones is located in a plane above the body at a height equal to the thickness of prints to be measured and with the body extending from the abutable edge of the series of tones to form a support for a print for abutting and planar coordination between a tone of the scale and that of the print, and a cursor movable relative to said members and associated therewith and forming a presser plate for manual application of pressure to the surfaces for coordinating the planes of the surfaces of a tone being matched and that of the print being measured.

7. A photographic scale comprising a support; a positive print including a series of steps extending throughout its length and having different tones and carried by said support with the tones terminating in a continuous abuttable edge for abutting cooperation with a print the tone of which is to be measured; and exposure factors applied to the respective steps and comprising values established by the relative exposures given the original steps to produce the respective tones and establishing the values of characteristics of a photographic material, element or process used in producing said print, by the exposure factors and their ratios of the steps matched in abutting relation by said print.

8. A photographic scale comprising a body having a tone scale and consisting of a series of steps ranging substantially from one extreme in tone to the other and geometrically-progressive in value with the tones extending to the edge of the body for abutting matching of the tones of a print therewith; a first series of numbers for said series of steps and forming tone-identification numbers for establishing identities of tones of the print matched therewith; a slide adjustable relative to said body; a second series of numbers including an index and carried by said slide for establishing tonal ranges and tone variations of photographic materials and elements used in production of the print; and a series of values established by exposures required to produce like tones on a predetermined photosensitive material with a predetermined process and forming characteristic values for the tones of the steps said values being applied to said slide and starting with index value coordinating with said index of said second series, said characteristic values establishing, in accordance with the specific and selective tones matched, characteristics and effects, including densities, exposure factors, potentials and speeds of photographic materials, elements or processes of which said print is a result or product, substantially as described.

9. A structure as defined in claim 8 in which a ledge is formed in a plane below the surface of said tone scale and projecting from the edge thereof to support an element of which a tone is to be measured with its surface in the same plane as that of the surface of the tones of the tone scale, and to guide the element into abutting contact with the edge of the tone scale to provide an uninterrupted surface for precision determinations.

10. A structure as defined in claim 8; a support, said characteristic values being formed on said support, said support being removably attached to said slide to permit substitution of a support with different characteristic values for measurement of prints made on a second photo-sensitive material differing from said predetermined photo-sensitive material and based on exposures required to produce like tones on said second photo-sensitive material, whereby the same scale of tones is adaptable for measuring characteristics and effects to varying degrees of tolerance in accordance with the type of photosensitive material employed for making the print and establishing the characteristic values.

11. A structure as defined in claim 8, and a cursor manually depressible and movable along said body and said slide and associated therewith and formed of transparent material and forming a presser plate which upon manual application of pressure coordinates the planes of the tone scale and that of an element being measured for precision matching of a tone of said print with a tone of said scale.

12. A structure as defined in claim 8 in which a ledge is formed in a plane below the surface of said tone scale and projecting from the edge thereof to support the print of which a tone is to be measured with its surface in the same plane as that of the surface of the tone scale, and to guide the element into abutting contact with the edge of the tone scale to provide an uninterrupted surface for precision matching and determinations; and a cursor manually depressible and movable along said body and said slide and associated therewith and formed of transparent material and forming a presser plate which upon manual application of pressure coordinates the planes of the tone scale and that of a print being measured by forcing said planes to assume an identical plane.

13. A slide rule comprising a body and a slide relatively movable; a tone scale comprising a series of tones ranging logarithmically in intensity and mounted on said body with its longitudinal edge in spaced relation to the longitudinal edge of the body, and a first series of numbers starting with 1 fixedly related to the series of tones and in parallel therewith to serially number the tones and forming tone identifying graduations; a second series of numbers including an index and carried by said slide in parallel to said series of tones and first series of numbers and forming tonal range graduations for initiating a series with any tone of the scale by movement of the slide to align said index with a tone matching one tone of a print and establishing the tonal range by the number of the second series aligning with the tone matching another tone of the print; a geometrically-progressive series of values based on the relative photo-actinic values of the tones as related to a predetermined photosensitive material, and carried by said slide in parallel to said second series and starting with minimum value coordinating with the index on the second series of numbers and with a value for each number of said second series and providing direct values through tone matching, of the characteristics and effects of a material being measured, substantially as described.

14. A structure as defined in claim 13 in which the surface of said tone scale is located in a plane above said body at a distance equal to the thickness of the material to be measured and having an abutting edge, for support of a material the tone of which is to be measured, in abutting contact with the scale and with its surface in the same plane as that of the tone scale, for precision matching.

15. A structure as defined in claim 13 in which the surface of the tones of said tone scale is located in a plane above the surface of said body at a distance equal to the thickness of the print to be measured and having an abutting edge for support of the print the tone of which is to be measured in abutting contact with the edge of the tone scale and with its surface in the same plane as that or the tone scale, and a cursor movable relative to said body and said slide and associated therewith and formed of transparent material and forming a presser plate for compressing the scale and a print being measured into a common plane for obtaining absolute planar coordination between the surfaces of the tone scale and that of the tone being matched.

16. A slide rule comprising a body, a slide, a cursor movable along said body and said slide and associated therewith; a tone scale comprising a logarithmic series of tones of increasing intensity serially numbered and applied to said body on one side of the slide and terminating in an abuttable edge and a ledge formed from said edge of said tone scale to support a print with its surface in the same plane as that of the tone scale; serial numbers applied to said slide in parallel with said series of tones and registrable therewith as a unit and having an index registrable with any tone on the tone scale by adjustment of the slide; and a series of exposure factors based on the relative photoactinic values of the tones as related to exposures required to produce the respective tones of the scale on a predetermined photo-sensitive material with predetermined processing and applied to the slide in registry with said serial numbers; said cursor being depressible and extending beyond the edge of the tone scale for forcing the surface of the print and that of the scale into the same continuous plane for precision matching.

17. A photographic scale comprising; a comparatively narrow support and a series of tone steps formed transversely thereon with the tones of the steps increasing in intensity from one end of the series to the other; said steps being serially numbered for identifying tone values of tones matched therewith; and a characteristic value applied to each division; said characteristic values varying geometrically-progressively with a ratio not to exceed 1.25 and consisting each of the value of the relative exposure required to produce the same tone on a predetermined photo-sensitive material with a predetermined system of processing, whereby the characteristic value and the serial number of a tone of the scale matched by the tone of a print produced on the same photo-sensitive material are measures and evaluations of the characteristics and effects, such as densities, potentials, speeds, ranges and variations thereof, created by any change or substitution of materials or elements used in processing the print, or in the system of processing, of which the print measured is the result or a product.

PHILIP A. FRIEDELL.